United States Patent
Ohashi et al.

(10) Patent No.: US 10,483,821 B2
(45) Date of Patent: Nov. 19, 2019

(54) STATOR FOR ROTATING ELECTRIC MACHINE FIXED TO FRAME WITH PREDETERMINED INTERFERENCE

(71) Applicant: Mitsubishi Electric Corporation, Tokyo (JP)

(72) Inventors: Naoki Ohashi, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 169 days.

(21) Appl. No.: 15/216,123

(22) Filed: Jul. 21, 2016

(65) Prior Publication Data

US 2017/0288493 A1 Oct. 5, 2017

(30) Foreign Application Priority Data

Mar. 31, 2016 (JP) .................. 2016-070175

(51) Int. Cl.
*H02K 5/20* (2006.01)

(52) U.S. Cl.
CPC ....................... *H02K 5/20* (2013.01)

(58) Field of Classification Search
CPC ................. H02K 5/20; H02K 9/19
USPC ................................. 310/54, 89
See application file for complete search history.

(56) References Cited

U.S. PATENT DOCUMENTS

| | | | | |
|---|---|---|---|---|
| 6,133,659 A | * | 10/2000 | Rao ............... | B60K 6/105 123/3 |
| 2005/0151431 A1 | * | 7/2005 | Cronin ............ | H02K 5/20 310/60 A |
| 2010/0033039 A1 | * | 2/2010 | Sakai ............. | H02K 5/20 310/54 |
| 2011/0080064 A1 | | 4/2011 | Kudose et al. | |
| 2013/0328423 A1 | * | 12/2013 | Ikeda ............. | H02K 5/20 310/54 |

FOREIGN PATENT DOCUMENTS

| | | |
|---|---|---|
| CN | 103069693 A | 4/2013 |
| JP | 4905568 B2 | 3/2012 |

(Continued)

OTHER PUBLICATIONS

Machine Translation, IWAI, JP 2015204667 A, Nov. 2015.*

(Continued)

*Primary Examiner* — Thomas Truong
(74) *Attorney, Agent, or Firm* — Sughrue Mion, PLLC; Richard C. Turner

(57) ABSTRACT

Provided is a stator for rotating electric machine that enables reduction in imbalance of compression stress on a stator core between a thin portion due to formation of a cooling passage of a frame and a thick portion where there is no cooling passage. This stator for rotating electric machine includes: a stator core 2 formed in a cylindrical shape; and a frame 4 having an inner circumferential side to which the stator core 2 is fitted and fixed with a predetermined interference, and an outer circumferential side on which a passage 6 for cooling fluid for cooling the stator core 2 is formed, wherein the interference at a thin portion A due to formation of the cooling passage 6, of the frame 4 is greater than the interference at a thick portion B where there is no cooling passage 6.

4 Claims, 2 Drawing Sheets

(56) References Cited

FOREIGN PATENT DOCUMENTS

| JP | 2013-9597 A | | 1/2013 |
|---|---|---|---|
| JP | 5136069 B2 | | 2/2013 |
| JP | 2015-204667 A | | 11/2015 |
| JP | 2015204667 A | * | 11/2015 |

OTHER PUBLICATIONS

Communication dated Feb. 28, 2017 issue by the Japanese Patent Office in corresponding application No. 2016-070175.
Communication dated Aug. 22, 2017 from the Japanese Patent Office in counterpart Application No. 2016-070175.
Communication dated Oct. 29, 2018 issued by the State Intellectual Property Office of People's Republic of China in counterpart Application No. 201611059913.6.
Communication dated May 17, 2019, from the State Intellectual Property Office of the P.R.C in counterpart application No. 201611059913.6.
Communication dated Mar. 12, 2019 from the State Intellectual Property Office of the P.R.C. in counterpart Application No. 201611059913.6.

* cited by examiner

STATOR FOR ROTATING ELECTRIC MACHINE FIXED TO FRAME WITH PREDETERMINED INTERFERENCE

BACKGROUND OF THE INVENTION

1. Field of the Invention

The present invention relates to a stator for rotating electric machine in which a stator core formed in a cylindrical shape is fitted and fixed to the inner circumferential side of a frame.

2. Description of the Background Art

In a conventional stator for rotating electric machine, a stator core formed in a cylindrical shape by stacking thin sheets is fitted and fixed to the inner circumferential side of a cylindrical frame, and cooling fluid such as cooling water or cooling oil is caused to flow on the outer circumferential side of the frame, thereby cooling heat generated at the stator core part (for example, Japanese Patent Publication No. 5136069).

In the conventional stator for rotating electric machine, a fixation force for the stator core is different between a thin portion due to formation of a cooling passage of the frame, and a thick portion where there is no cooling passage, resulting in imbalance of compression stress. Further, when the rotating electric machine is being driven, the stator core generates heat and expands in the circumferential direction. Meanwhile, the frame is cooled by the cooling fluid, whereby the imbalance of compression stress becomes further significant, thus raising a concern that deformation or iron loss in the stator core fitted and fixed to the thick portion of the frame increases. In the case of reducing the interference in order to avoid the above concern, a fixation force at the thin portion of the frame reduces when the stator core has not been overheated yet at the time of, for example, starting the rotating electric machine. As a result, the stator core might be displaced or dropped off, and the closeness of contact between the stator core and the frame at this part might be reduced, whereby the cooling effect also might be reduced.

SUMMARY OF THE INVENTION

The present invention has been made to solve the above problem, and an object of the present invention is to provide a stator for rotating electric machine that enables reduction in imbalance of compression stress on a stator core between a thin portion due to formation of a cooling passage of a frame and a thick portion where there is no cooling passage.

A stator for rotating electric machine according to the present invention includes: a stator core formed in a cylindrical shape; and a frame having an inner circumferential side to which the stator core is fitted and fixed with a predetermined interference, and an outer circumferential side on which a passage for cooling fluid for cooling the stator core is formed, wherein the interference at a thin portion due to formation of the cooling passage, of the frame is greater than the interference at a thick portion thereof where there is no cooling passage.

According to the present invention, the stator for rotating electric machine includes: a stator core formed in a cylindrical shape; and a frame having an inner circumferential side to which the stator core is fitted and fixed with a predetermined interference, and an outer circumferential side on which a passage for cooling fluid for cooling the stator core is formed, wherein the interference at a thin portion due to formation of the cooling passage, of the frame is greater than the interference at a thick portion thereof where there is no cooling passage, thus providing an effect of obtaining a stator for rotating electric machine that enables reduction in imbalance of compression stress on a stator core between a thin portion and a thick portion of a frame.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

Figure 1:
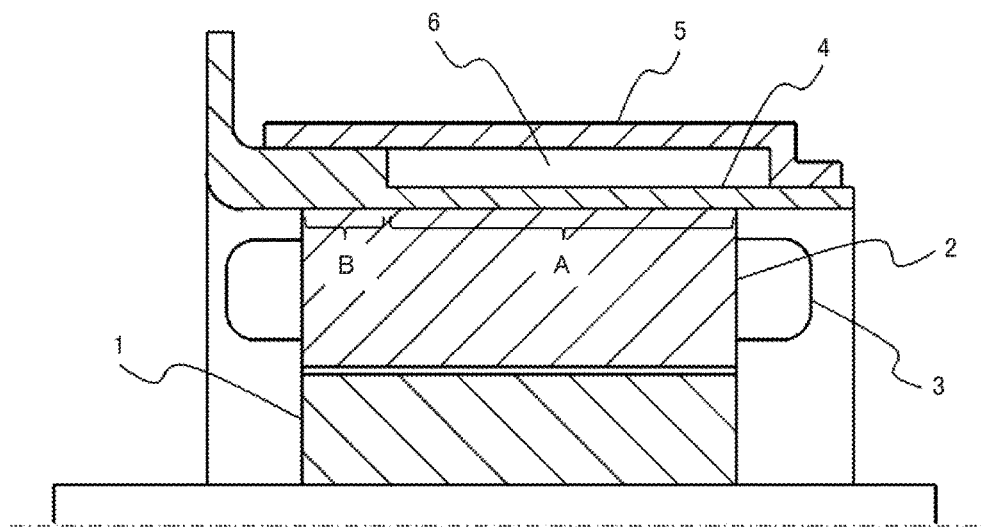
FIG. 1 is a sectional view showing a schematic configuration of a stator for rotating electric machine according to the first embodiment of the present invention.

Hereinafter, embodiments of the present invention will be described in the drawings, the same or the corresponding components are denoted by the same reference characters.

First Embodiment

FIG. 1 is a sectional view showing a schematic configuration of a stator for rotating electric machine according to the first embodiment of the present invention. In FIG. 1, a stator core 2 provided on the outer circumferential side of a rotor 1 rotatably supported is formed in a cylindrical shape by stacking, in the axial direction, thin steel sheets stamped in a predetermined shape, and a stator winding 3 is attached thereto. The stator core 2 is fitted and fixed, with a predetermined interference, by shrink fit or press fit, to the inner circumferential side of a frame 4 obtained by shaping a thin iron sheet into a cylindrical shape. An outer cylindrical frame 5 is attached to the outer circumferential side of the frame 4, and a passage 6 for cooling fluid such as cooling water or cooling oil for cooling the stator core 2 is formed therebetween.

Although the above description shows the case where the frame 4 is obtained by shaping a thin iron sheet into a cylindrical shape, the method for manufacturing the frame 4 is not limited to thin sheet shaping, and the material thereof is not limited to iron.

The part of the frame 4 where the cooling passage 6 is formed is made as thin as possible in order to efficiently transfer heat from the stator core 2 to the cooling fluid, and therefore the rigidity of this part is greatly different from that of a thick portion of the frame 4 where the cooling passage 6 is not formed. If the interference for fitting and fixing the frame 4 and the stator core 2 together is designed to be constant, at the thick portion of the frame 4, a tightening force for fixing the stator core 2 becomes excessively great. As a result, the stator core 2 might be deformed in the axial direction or iron loss might increase. In addition, at the thin portion of the frame 4 where the passage 6 is formed, a tightening force is insufficient. As a result, fixation of the stator core 2 might become insufficient, or the closeness of contact therebetween decreases and the thermal conductivity deteriorates, whereby the cooling performance for the stator core 2 might be deteriorated. In order to eliminate such concerns, the inner diameter of a thin portion A of the frame 4 shown in FIG. 1 is designed to be smaller than the inner diameter of a thick portion B.

Thus, since the inner diameter or the thin portion A is smaller than the inner diameter of the thick portion B, the stator core 2 is not strongly tightened at the thick portion, and the tightening force is uniformed in the axial direction, whereby it becomes possible to prevent iron loss imbalance (which affects sound, vibration, and efficiency) due to compression stress on the stator core 2 at the part fitted to the thick portion, and to prevent deformation in the axial direction of the stacked stator core 2. In particular, this makes it possible to suppress, during operation in which the rotating electric machine is driven, the phenomenon in which the stator core 2 thermally expands due to heat generation from the stator core 2 and the stator winding 3, and the frame 4 is cooled by the cooling fluid, whereby the tightening force (compression stress) of the thick portion becomes further excessive.

Since the thin portion of the frame 4 fixes the stator core 2 so as to be tightened to a certain extent, the fixation force at ordinary temperature can be satisfied, and since increase in compression stress of the thin portion when the temperature of the stator core 2 increases is smaller than that of the thick portion, extreme increase in compression stress does not occur. Since the interference of the thin portion is great, the closeness of contact between the stator core 2 and the frame 4 is improved and the thermal conductivity is enhanced, so that the stator core 2 is cooled well.

Second Embodiment

Figure 2:
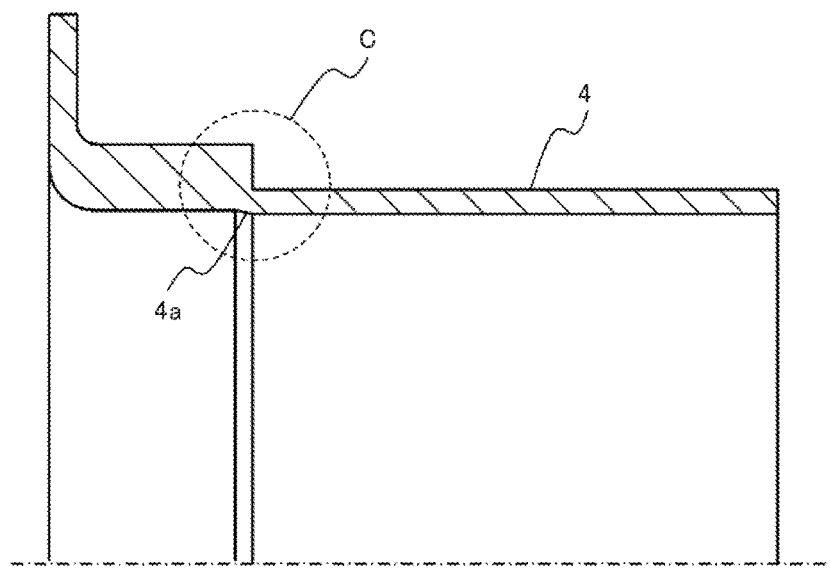
FIG. 2 is a sectional view showing a frame of a stator for rotating electric machine according to the second embodiment of the present invention.
Figure 3:
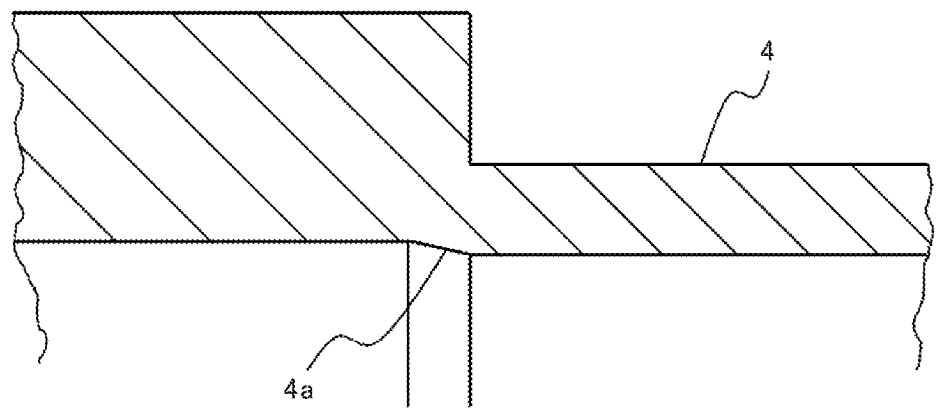
FIG. 3 is a partial sectional view showing a taper portion on the inner circumferential side of the frame of the stator for rotating electric machine according to the second embodiment of the present invention.

FIG. 2 is a sectional view showing a frame of a stator for rotating electric machine according to the second embodiment of the present invention. FIG. 3 is a partial sectional view showing a taper portion on the inner circumferential side of the frame of the stator for rotating electric machine according to the second embodiment of the present invention, and showing the details of part C in FIG. 2.

In the above first embodiment, the case where the inner diameter of the thin portion of the frame 4 is smaller than the inner diameter of the thick portion has been described. However, in the case where there is a step due to difference in the inner diameter, there is such a concern that, when the stator core 2 is fitted to the frame 4, the stator core 2 is caught by the step and cannot be fitted straight, or the fitting is performed while the step of the frame 4 is scraped, whereby the press-fit force becomes excessively great. In the second embodiment, as shown in FIG. 2 and FIG. 3, the step between the large diameter portion and the small diameter portion on the inner circumferential side of the frame 4 is formed as a taper portion 4a, thereby enabling smooth fitting.

The other configuration is the same as in the first embodiment, and the description thereof is omitted.

Third Embodiment

In the above first embodiment, the case where the inner diameter of the thin portion of the frame 4 is smaller than the inner diameter of the thick portion has been described. In the third embodiment, while the inner diameter of the frame 4 is constant, the outer diameter of the stator core 2 at a position corresponding to the thin portion A in FIG. 1 may be designed to be greater than the outer diameter at a position corresponding to the thick portion B, whereby the same effect as in the first embodiment can be obtained.

The other configuration is the same as in the first embodiment, and the description thereof is omitted.

It is noted that, within the scope of the present invention, the above embodiments may be freely combined with each other, or each of the above embodiments may be modified or simplified as appropriate. The present invention is not limited to the above embodiments.

Various modifications and alterations of this invention will be apparent to those skilled in the art without departing from the scope and spirit of this invention, and it should be understood that this is not limited to the illustrative embodiments set forth herein.

What is claimed is:

1. A stator for a rotating electric machine, comprising:
   a stator core formed in a cylindrical shape; and
   a frame having an inner circumferential side to which the stator core is fitted and fixed with a predetermined interference, and an outer circumferential side on which a passage for cooling fluid for cooling the stator core is formed,
   wherein the interference at a thin portion of the frame formed along an inner surface of the cooling passage is greater than the interference at a thick portion thereof where there is no cooling passage,
   wherein the thin portion of the frame is provided adjacent to the thick portion of the frame in an axial direction of the stator core, and
   wherein an inner diameter of the thin portion of the frame is smaller than an inner diameter of the thick portion.

2. The stator for the rotating electric machine according to claim 1, wherein
   a step part in an axial direction formed due to difference in the inner diameter of the frame is formed in a taper shape.

3. The stator for the rotating electric machine according to claim 1, wherein
   an outer diameter of the stator core at a part fitted and fixed to the thin portion of the frame is greater than an outer diameter of the stator core at a part fitted and fixed to the thick portion of the frame.

4. The stator for the rotating electric machine according to claim 1, wherein
   the thick portion of the frame is provided beyond an extreme axial end of the cooling passage in the axial direction of the stator core.

* * * * *